July 28, 1931.  L. H. CHURCH  1,816,667
CABLE CONNECTER
Filed Nov. 12, 1926
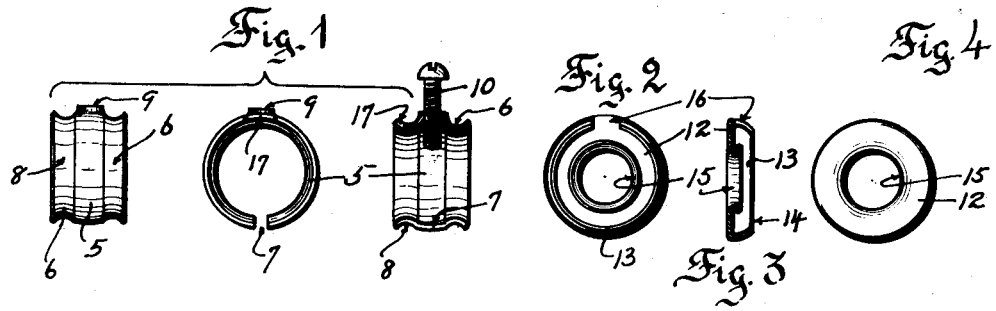
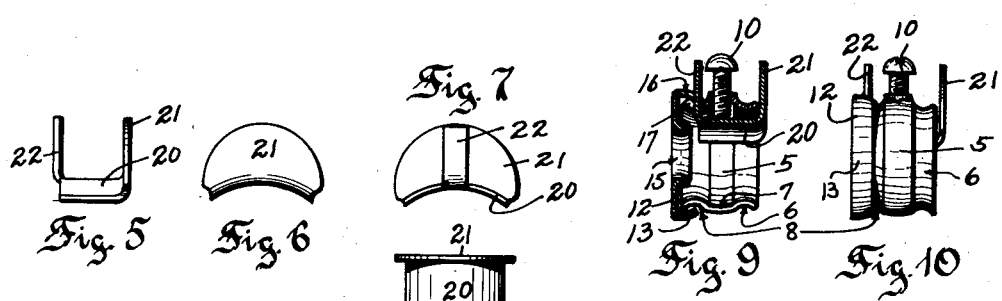
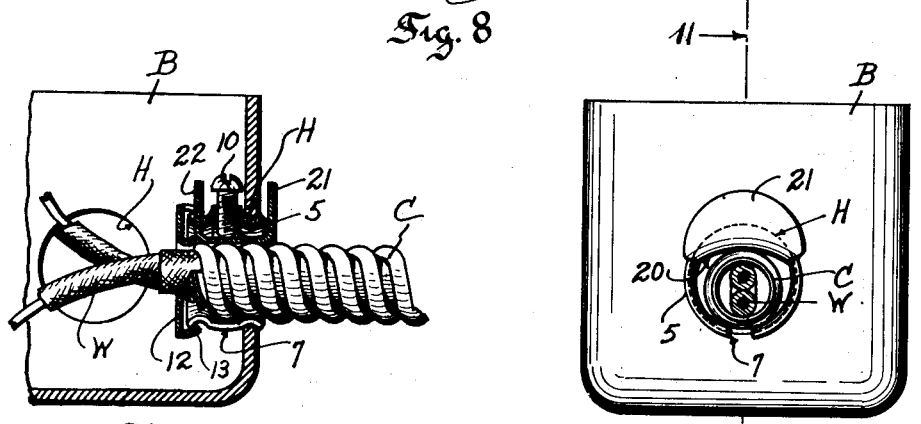
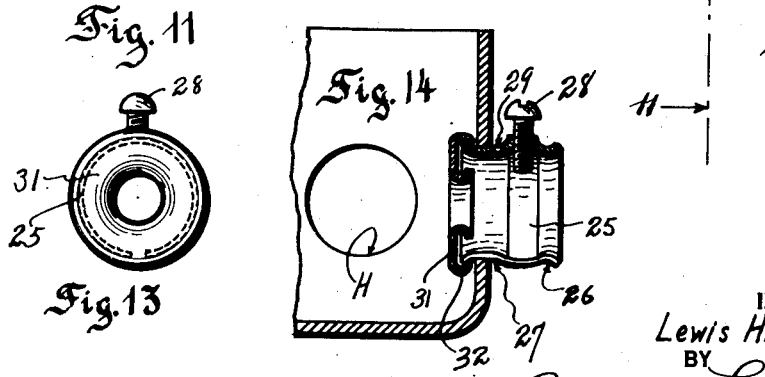
INVENTOR
Lewis H. Church
BY
Bohleber + Ledbetter
ATTORNEYS Patented July 28, 1931

1,816,667

UNITED STATES PATENT OFFICE

LEWIS H. CHURCH, OF ELIZABETH, NEW JERSEY, ASSIGNOR TO THE THOMAS & BETTS CO., OF ELIZABETH, NEW JERSEY, A CORPORATION OF NEW JERSEY

CABLE CONNECTER

Application filed November 12, 1926. Serial No. 148,071.

This invention relates to cable connecters and particularly to improvements in bushings therefor, and relates to adapted connecters capable of universally anchoring all sizes and shapes, flat or round, large or small, armored or soft, cable to electric fixture boxes.

An outstanding object of the invention is to provide on or for an adapter cable connecter, which is capable of such universality of use with the variety of cable as above stated, a new and useful quick detachable snap-on bushing which acts as a stop against which rests the ragged sharp end of a metal armored cable as well as to guide and protect the insulation covered wires from being abraded by the sharp metal armored cable end. In attaining this object, a full-fashioned solid ring circular bushing may be carried with the connecter, particularly when the connecter itself is split or otherwise constructed to render it elastic to facilitate its anchorage in a box.

My invention therefore among other things is characterized by reason of combining a separable quick detachable snap-on unsplit bushing with a mutilated connecter member as for example a split sleeve or a sleeve otherwise made to perform the functions required of it. Thus when the connecter is used with armored cable, the bushing is left attached to protect the insulation covered wires, but when soft cable, i. e. fibre armored cable is used, the bushing may be detached and thrown aside since on fibre armored or soft cable there is no sharp metal armor burrs to abrade the wires. It is therefore unnecessary to manufacture a distinct type of connecter for each style of cable with which one is usually confronted in building construction.

Also, it is an object to produce a combination adapter connecter and bushing therefor, wherein the bushing is entirely independent of and does not interfere with or cooperate with the adapter element. That is to say I produce an adapter for a connecter to convert it for use with a wide range of cable sizes which adapter works with or without the bushing and thus the adapter functions independently of the bushing, but at the same time a single operating means functions to permanently fasten the bushing in place and clamp the adapter into place.

A still further object of the invention is to produce a cable connecter including a cable bearing clamp plate with novel guide means therefor to guide the movement of the clamp plate in relation to and in or on the connecter member to maintain the necessary working relation or alignment between the clamp plate and operating means; and also an object may be to include sleeve closing means as a part of and worked by the clamp plate.

With the above and other objects in view, the invention has relation to the several examples of construction and modes of assembly and operation as presented in the accompanying drawings which show examples of the invention, and it is understood that the connecter may be varied in construction, operation and use without departing from the principles of this invention.

Figure 1 is a group of views of a connecter base member, being a side, and end, and a longitudinal section of a member on which is to be mounted the movable appurtenances necessary to complete a cable connecter. In this instance a sleeve is used by which to explain an example of the invention.

Figures 2, 3 and 4 are a group of bushing views illustrating an improved quick detachable snap-on full-fashioned bushing adapted to be used or not used, as circumstances require, on a connecter of the type shown in Figure 1, or on an adapter cable connecter as shown in Figure 9. Figure 2 shows an inside view of the bushing, Figure 3 a cross-section, and Figure 4 an outside view thereof.

Figures 5 to 8 inclusive illustrate an improved adapter element which includes a clamp plate, a shutter, and guide means, and which may be used with the connecter to convert it into an adapter connecter if desired. Figure 5 is a side view, Figure 6 is a shutter end view, Figure 7 a view of the other end, i. e. the guide means end, and Figure 8 a plan view of said adapter.

and a side el...
...cter carryi...
including...

Eight...
Robber and a side ele
including distribu...

8 or 6 and by properly positioning the connecter in the box. The screw 10, when run down against a cable in the sleeve, clamps against the cable and expands the sleeve to anchor it in a box hole.

With reference to the improved quick detachable snap-on bushing, an example thereof is separately shown in Figures 2 to 4. The bushing comprises a solid full-fashioned unbroken ring portion 12 including a peripheral snap-on flange 13 which has an outer reduced rim edge 14 of less diameter than the periphery of the ring 12 thereby forming the slightly conically curved snap-on flange 13. The ring 12 carries a bushed aperture 15 through which the insulation wires W are passed to the box B and the bushing acts as a stop against which the ragged end of the cable armor rests when inserted in the connecter.

The snap-on bushing flange 13 may be pressed over the end of the sleeve until the cupped or conical flange 13 snaps onto the sleeve groove 8 since the sleeve 5 is split at 7 to permit slight sleeve contraction. When the sleeve end enters the bushing flange 13, the sleeve expands causing the flared end of the sleeve to interengage and hook into the inside of said flange 13 and thus the sleeve and bushing hang together; and although slightly loose in relation at first, the two parts become positively and immovably joined when the screw 10 is run down against the cable C or against an adapter as later explained. The screw operating, pressure producing, or cable clamp means 10 causes one sleeve groove 6 to expand and anchor in a box hole H and causes the bushing groove 8 to expand in the bushing 12 to fasten it on the sleeve end.

A description will now be given of the adapter element or device used with a cable connecter of the type above described and by which the connecter is converted and made to work with several sizes of cable as well as different shaped cable.

When the cable connecter is used with both the bushing and adapter, it may be preferred, according to one form of the invention, to cut a slot 16 in the bushing snap-on flange 13 so as to permit a guide means or tongue 22 on the adapter to slide up and down in close relation to the bushing 12. For this purpose I preferably manufacture the bushing with the slot 16 formed therein, and the bushing may therefore be used with or without the adapter element.

Furthermore, it is desirable to cut a similar slot 17 in the connecter member 5, i. e. in one end or near one end of the sleeve. The bushing slot 16, and the connecter slot 17, register one with the other so as to permit the adapter guide 22 to slide up and down through both slots 16 and 17. If for any reason the adapter is not to be used, the slots 16 and 17 do not interfere with the normal operation of the cable connecter and bushing, with the adapter omitted.

The adapter construction is separately shown in Figures 5 to 8, and comprises a cable bearing clamp plate 20 on one end of which is formed a shutter 21, and on the other end of which is formed the guide tongue 22. The shutter 21 is preferably circular in form and sufficiently large to close the sleeve 5, the shutter being designed to close the sleeve passage and box hole H as well, and the tongue 22 acts to guide the adapter in straight lateral motion in relation to the sleeve.

The adapter 20—22 is mounted slidable on or in the connecter member 5 with the clamp plate 20 parallel to the sleeve axis and adapted to move or adjust laterally therein for large or small cable. The shutter 21 slides up and down at the end of the sleeve 5, while the guide tongue 22 slides through the sleeve slot 17. In case the bushing 12 is used, the guide tongue 22 also slides through the bushing slot 16. The guide means 17—22 for the adapter restrains it against axial rotation in the sleeve, thus maintaining the clamp plate 20 in working alignment with the end of the screw 10.

The connecter member sleeve 5 is in effect slidably retained between the upstanding parallel members 21 and 22 of the adapter with the screw 10 standing parallel between the shutter 21 and guide tongue 22 which places the screw 10 perpendicular to the clamp plate 20 in position to deliver pressure thereto and hold the shutter 21 in closed position.

The complete connecter with all operating parts or appurtenances is shown in Figures 11 and 12, and the connecter may be first mounted in the box hole H without the cable C, whereupon the cable is introduced into the connecter, and the screw 10 runs the adapter 20—22 down against the cable. The screw delivers pressure to the adapter, particularly to the clamp plate 20 which clamps the cable C in the sleeve 5 and in the box hole H and simultaneously expands the split sleeve 5 to anchor the sleeve groove 6 against the box hole edge. Furthermore, the screw 10 holds the shutter 5 in place, and when very small size cable is fastened in the box, the shutter goes down to close off that part of the connecter passage not occupied by the cable. Thus the shutter closes the box hole and closes the sleeve. Also the screw 10 expands the bushing groove 8 to fasten the sleeve in the bushing. The screw operating means 10 is mounted inside the box B so that the cable connecter is well adapted for both new and old housework. It is noteworthy that a single screw operating means performs the several functions as above explained.

I have described several examples of my invention by way of its numerous adaptations and have explained how the sleeve 5 may be used alone with the bushing 12 which is practical where a heavy large size metal armored cable is to be anchored in a box. For example, the mechanic may simply bend the guide tongue 22 out of the sleeve slot 17 and throw the adapter 20—22 aside and replace the bushing 12. The cable connecter is economically produced with the adapter and the bushing, but either one or the other, i. e. the bushing or the adapter, may be dispensed with in certain kinds of work. In this way, only one connecter need be employed for all varieties of cable.

Referring to Figures 13 and 14, there is shown a modified form of the invention. Also, there is shown a complete connecter without the adapter, although it may be used if desired. Furthermore, Figure 14 illustrates how the connecter may be manufactured so that the screw operated means thereof may be placed on the outside of the box if desired.

In this modified form, there is shown a sleeve 25 which is somewhat longer than the sleeve formerly described. It is provided with box hole edge engaging means, such as a groove 26 near one end, and a wide groove 27 near the other end. A screw 28 is threaded as usual through the connecter member 25 to clamp against a cable. A slot 29 may be punched through the sleeve 25 for the reception of the adapter guide tongue 22 in case it is desired to use the adapter 20—22 with this sleeve connecter 25. This slot 29 is placed adjacent the screw and back from the longer end of the sleeve.

What is of particular importance, is that the groove 27 is wider than the groove 26 and performs two purposes, namely, that of anchoring the sleeve 25 in the box hole H, and that of securely fastening a bushing 31 onto the end of the sleeve 25 inside the box. This form of cable connecter is so designed and constructed as to permit the screw 28 to be placed on the outside of the box, and this is accomplished by making the box hole edge anchorage groove 27 long enough or wide enough to receive the box hole edge H and to receive the snap-on flange 32 of the bushing 31.

Thus the bushing flange 32 and box hole wall edge H is received onto the sleeve anchorage groove 27, and when the split sleeve 25 expands, it follows that the groove 27 expands in the bushing 31 as well as in the box hole, so that the bushing is fastened on the end of the sleeve 25 simultaneously with the anchorage of the sleeve itself in a box hole. The adapter 20—22 may as well be used with this sleeve 25 as others and the screw 28 actuates the adapter and holds all parts in closed anchored position. If for any reason it is desired to place the screw 28 inside the box, the anchorage groove 26 is snapped into the box hole H, and the connecter possesses a utility similar to that shown in the box views Figures 11 and 12.

The invention fulfills the need felt for a cable connecter of such wide utility as herein described.

What I claim is:

1. A connecter comprising, a member including box hole edge anchorage means, operating means carried with the connecter to clamp against a cable and render effective the box anchorage means; and a separate bushing including means to detachably mount it on the connecter.

2. A connecter comprising, a sleeve including box hole edge anchorage means, operating means carried with the connecter to clamp against a cable and to render effective the anchorage means, and a bushing including means to snap it on the sleeve and anchor it there by movement of the sleeve by pressure from the operating means.

3. A connecter comprising, a member including box hole edge anchorage means, operating means carried with the connecter to clamp against a cable and render effective the box anchorage means; a full fashioned circular bushing, and means to fasten the bushing on the member by movement of the member by pressure from the operating means.

4. A connecter comprising, a member including box hole edge anchorage means, operating means carried with the connecter to clamp against a cable and render effective the box anchorage means; said member provided with a bushing receiving groove, a bushing including means to engage the receiving groove, and coact with the operating means by which the bushing is gripped on the member.

5. A connecter comprising, a member including box hole edge anchorage means at one end and provided with a bushing receiving portion at the other end, a bushing disposed on the latter end, and operating means to clamp a cable and expand the bushing receiving portion.

6. A connecter comprising; a sleeve including box hole edge anchorage means at one end, and bushing receiving means at the other end; a bushing including a groove engaging portion mounted on the latter end; and operating means including means to expand the bushing receiving means, and to render effective the box hole anchorage means.

7. A connector comprising; a sleeve including box hole edge anchorage means at one end, and bushing receiving means at the other end; a bushing including a groove engaging portion mounted on the latter end; and a screw threaded through the sleeve between the anchorage means and bushing means, and including means to expand the sleeve to anchor the connecter in a box and clamp against a cable and to anchor the bushing to the sleeve.

8. A connecter comprising; a sleeve split longitudinally, and a circumferential groove at each end; a screw threaded through the sleeve between the grooves to grip a cable and expand the sleeve; and a bushing including means disposed in one of the grooves to fasten the sleeve and bushing together by expansion of the sleeve.

9. A connecter comprising; a sleeve split longitudinally, and a circumferential groove at each end; a bushing including a rounded aperture, and a peripheral flange engaging one of the grooves on the sleeve; and operating means mounted between the sleeve grooves to expand both sleeve ends and clamp against a cable.

10. A connecter comprising, a sleeve split lengthwise and grooved circumferentially near each end; a bushing including a ring having a peripheral conic flange the outer edge of which is less in diameter than the edge joining the ring, and engaging one of the grooved sleeve ends; and operating means to expand the sleeve groove into the conic flange of the bushing.

11. A connecter comprising; a member including box hole edge anchorage means, and a guide passage; a cable clamp plate mounted parallel to the member and movable laterally, and including an integral right angle guide tongue slidable in the guide passage; and operating means carried with the connecter to deliver pressure to the clamp plate.

12. A connecter comprising; a sleeve split longitudinally, including box hole anchorage means, and a guide passage through the sleeve; a cable clamp plate mounted in the sleeve and laterally movable, including a guide member on the clamp plate slidably disposed in the guide passage; and operating means carried by the connecter to impose pressure on the clamp plate and expand the sleeve.

13. A connecter comprising; a sleeve split longitudinally, including box hole anchorage means, and a guide passage through the sleeve; an adapter including a cable clamp plate laterally movable in the sleeve, a shutter on one end of the clamp plate slidable at one end of the sleeve, and a guide tongue carried with the clamp plate parallel to the shutter and slidably disposed in the sleeve guide passage; and operating means to deliver pressure to the clamp plate and expand the sleeve.

14. A connecter comprising, a member including box hole edge anchorage means, a detachable bushing carried with the member including means to hold the bushing on the connecter, a clamp plate carried on the member including guiding and retaining means to movably hold the plate in working position, and operating means to deliver pressure to the clamp plate.

15. A connecter comprising, a sleeve including box hole edge anchorage means, a detachable bushing carried with the sleeve including means to hold the bushing on said sleeve, a clamp plate carried with the sleeve including guiding and retaining means to movably hold the plate in working position, and operating means mounted on the sleeve to deliver pressure to the clamp plate.

16. A connecter comprising, a sleeve including box hole edge anchorage grooves at each end, a detachable bushing carried with the sleeve including means to fasten the bushing on one of the sleeve grooves, a clamp plate carried by the sleeve including guiding and retaining means, to movably hold the plate in working position, and operating means to deliver pressure to the clamp plate.

17. A connecter comprising, a sleeve including box hole edge anchorage means, a detachable bushing carried with the sleeve including means to hold the bushing on the connecter; an adapter carried with the sleeve including a sleeve closing shutter, means to guide the shutter, and a cable clamp plate; and operating means to deliver pressure to the adapter.

18. A connecter comprising, a member including, box hole edge engaging means, and a clamp plate guide passage; a cable clamp plate movably carried on the member including a tongue slidably confined in the guide passage, operating means carried with the connecter to deliver pressure to the clamp plate; and a bushing including, means to detachably mount it on the member, and a clamp plate guide passage through which the tongue slides and placed in alignment with the passage in the member.

19. A connecter comprising, a sleeve including, box hole edge engaging means, and a clamp plate guide passage; a cable clamp plate movably carried in the sleeve including a tongue slidably confined in the guide passage, operating means carried with the connecter to deliver pressure to the clamp plate; and a bushing including, means to detachably mount it on the sleeve, and a clamp plate guide passage through which the tongue slides and placed in alignment with the passage in the sleeve.

20. A connecter comprising; a sleeve including, a lengthwise split, box hole edge engaging means, and a clamp plate guide passage; a cable clamp plate movably carried in the sleeve including a tongue slidably confined in the guide passage, operating means carried with the connecter to deliver pressure to the clamp plate and to expand the sleeve, and a bushing including, means to detachably mount it on the sleeve end, and a clamp plate guide passage through which the tongue slides and placed in alignment with the passage in the sleeve.

21. A connecter comprising; a sleeve including, box hole edge engaging means, and an adapter guide passage; an adapter movably carried in the sleeve including, a tongue slidably confined in the guide passage, a cable clamp plate, and a shutter to close the sleeve; operating means carried with the connecter to deliver pressure to the clamp plate and hold the shutter closed; and a bushing including, means to detachably mount it on the member independently of the adapter, and means dependent on the movement of the operating means to fasten the bushing on the sleeve end, and a clamp plate guide passage through which the tongue slides and placed in alignment with the passage in the sleeve.

In testimony whereof I affix my signature.

LEWIS H. CHURCH.